Patented Sept. 16, 1952

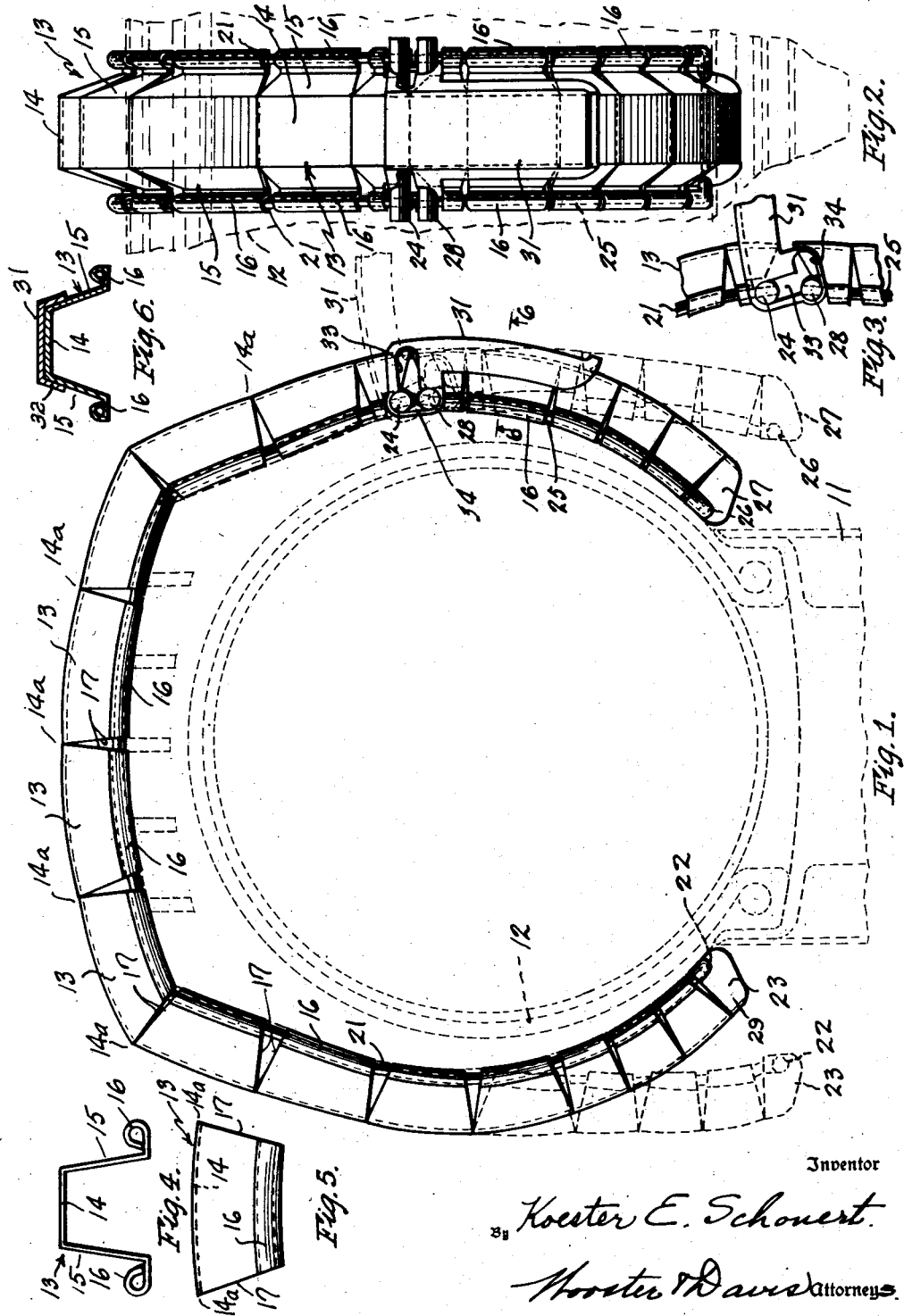

2,610,665

UNITED STATES PATENT OFFICE 2,610,665

VEHICLE TIRE TRACTION DEVICE

Koester E. Schonert, Stamford, Conn., assignor to Electro Craft Incorporated, Stamford, Conn., a corporation of Connecticut Application January 12, 1950, Serial No. 138,111

12 Claims. (Cl. 152—225)

This invention relates to traction devices for vehicle wheels and particularly to detachable anti-friction devices for emergency use on wheels, pneumatic tires and the like.

An object is to provide a traction device in the form of a removable flexible cleat of improved construction which can be easily attached to or detached from a vehicle wheel.

A further object is to provide a removable cleat for vehicle wheels of such construction and arrangement that the weight of the associated vehicle on the cleat increases the gripping action thereof on the wheel.

A further object is to provide a quickly detachable traction device for vehicle wheels of such construction that it can be inexpensively made from sheet metal to provide a rugged, long wearing cleat.

A further object is to provide a device of the above type so arranged that a unit of given size can be easily adapted to fit a variety of different pneumatic tire sizes.

With the foregoing and other objects in view, I have devised the construction illustrated in the accompanying drawing forming a part of this specification. It is, however, to be understood the invention is not limited to the specific details of construction and arrangement shown, but may embody various changes and modifications within the scope of the invention.

In this drawing:

Fig. 1 is a side elevation of an anti-friction device constructed in accordance with one embodiment of the invention, showing it in operative clamping position on a pneumatic tire;

Fig. 2 is a front elevation of the device shown in Fig. 1;

Fig. 3 is a partial elevation similar to Fig. 1, showing the locking mechanism in unlocked position;

Figs. 4 and 5 are end and side views, respectively, of one of the traction elements employed in forming the cleat shown in Figs. 1 and 2, and Fig. 6 is a section on the line 6—6 of Fig. 1.

For the purposes of disclosure, the illustrated embodiment of the invention is shown in connection with a wheel 11 having a pneumatic tire 12 mounted thereon, but it will be understood that the invention is equally adapted for use with other types of wheels and tires.

As shown in the drawing, the invention includes a plurality of segmental, traction elements 13 each having a cross section of general U-shape as shown in Figs. 4 and 6, providing a flat, ground-engaging web 14 and tapered side wings or arms 15. Eyes or loops 16 extend longitudinally along the edge of each arm for a purpose to be later described. The ends 17 of each element are also tapered, as shown in Fig. 5, so that the different elements can be connected together for relative hinging movement. As shown, the ends of the webs 14 are arranged in abutting engagement, particularly at their outer end edges 14a, whereby relative hinging movement of the elements about these edges in one direction causes the cleat to contract into gripping engagement with the periphery and side walls of the tire 12, while hinging movement of the elements in the other direction causes the cleat to expand and release the tire. An actuating and locking device is provided for expanding and contracting the cleat and for locking the parts in contracted position. This includes a tension member extending longitudinally of the traction elements 13 and slidable through the eyes 16. The tension member is connected to the end elements to that variation in the effective length of the tension member causes the cleat to contract or expand, depending upon whether the tension member is shortened or lengthened.

As illustrated, the tension member is shown as a flexible wire cable having one section 21 which extends through the eyes 16 along one side of a plurality of the traction elements 13, thence through a passage 22 extending through the end element 23 and back through the eyes 16 on the other side of the same traction elements 13. The ends of the cable section 21 are secured to a cross bar 24. A second cable section 25 extends through the eyes 16 on one side of the remaining traction elements 13, through a transverse opening 26 in the other end element 27, and back through the eyes 16 on the opposite sides of the remaining traction elements to a second cross bar 28 to which each end of the cable section 25 is connected. Each end section of the cleat is shown as formed of elements 29 of shorter length than the elements 13 which form gripping elements adapted to conform to the shape of the side walls of a pneumatic tire adjacent the bead of the tire.

The cable holding cross bars 24 and 28 are located adjacent each other and form part of the clamping mechanism. By drawing the bars together the arcuate inner edges of the elements 13 will be drawn together, causing the cleat to contract from the expanded position shown in broken lines in Fig. 1 into the contracted position shown in full lines, in which position it will grip the periphery and adjacent side areas of the associated wheel, pneumatic tire or the like.

This operation is effected by a locking lever 31 of channel shape having at one end parallel slotted side arms 32 which straddle the traction elements 13 adjacent the cross bars. Each arm has a pair of intersecting cam slots, one slot 33 being longer than the intersecting slot 34 and positioned at right angles thereto. As shown, the long slot 33 is also at right angles to the main body portion of the lever 31.

The adjacent ends of the cross bars 24, 28 are located in the opposite parallel slots, as shown in Figs. 1 and 3. In the unlocked position shown in Fig. 3, the ends of the cross bars lie in opposite ends of the long slot 33. In this position the lever 31 extends outwardly at an angle to the cleat, and the latter is so expanded that it can be easily applied to or removed from a tire or the like. When in position on a tire, for example, the cleat is contracted into gripping engagement by pressing the lever 31 down against the cleat over which it fits closely, as shown in Fig. 6, as it is of the same general shape in cross section as the outer portions of the segments. This movement swings the cam slots relatively to the cross bars so that the rod 28 moves along the short slot 34. Thereupon the lever swings about the rod 28 as a center with the result that the rod 24 is cammed along the edge of the slot 33 until it seats in the end of the short slot opposite the rod 28. In this position the lever lies flat against the cleat and the latter is contracted into gripping engagement with the tire. In order to reduce to a minimum the bending effect produced on the cross rods by the clamping operation, the lever 31 is so formed as to engage the rods as near as possible to the points of connection to the cables.

The wings or arms 15 of the traction elements 13 are spaced sufficiently far apart with relation to the height of the cross section to prevent any "heeling over" or rocking of the elements on the wheel as a result of the traction forces. When employed on a yielding surface, such as a pneumatic tire, the weight of the vehicle may cause both the tire and the center portion of the cleat directly over the outer periphery of the tire to yield upon engagement with the ground. Such movement of the center traction elements has the effect of further shortening or drawing in the tension member with the result that the grip of the cleat on the tire is increased at the moment when the traction stresses are applied to it, in this way insuring against slippage of the cleat on the tire.

As shown in Figs. 1 and 2, I prefer to locate the locking lever 31 on the side of the cleat, or that is, over a side wall of the tire, where it is readily accessible and located away from the tread or road engaging portion, at the same time spacing it far enough from the end element 27 to leave gripping areas of substantially equal extent at each end composed of the smaller gripping elements.

The construction is such that a given size of cleat can be applied to and grip a range of sizes of tires. Also, a given cleat can quickly be fitted to a tire by changing the length of the tension member and, if necessary, inserting or removing individual traction elements 13, as may be required.

The invention can be variously modified and adapted within the scope of the following claims.

Having thus set forth the nature of my invention, I claim:

1. A traction device for pneumatic tires comprising a plurality of generally U-shaped segmental elements connected together for relative hinging movement to form a road engaging cleat adapted to embrace the periphery and side walls of a pneumatic tire, a cable slidably connected with the inner edges of said elements, and means for varying the effective length of said cable to contract said elements into gripping engagement with a tire.

2. A traction device for vehicle wheels comprising a plurality of segmental elements connected together for relative hinging movement to form a road engaging cleat adapted to embrace the periphery and side walls of a vehicle tire, means for causing said cleat to grip a vehicle tire including a flexible cable tension member having one section slidably connected to a portion of said elements and secured to one end element, a cross rod connected to the ends of said section, a second cable section slidably connected to the remaining elements and secured to the other end element, a second cross rod connected to the ends of said second cable section, a locking lever having cam slots engaging said cross rods to draw said rods together and thereby reduce the effective length of said tension member to cause said cleat to contract and grip the periphery and side walls of a tire.

3. A traction device for vehicle wheels comprising a plurality of segmental elements connected together for relative hinging movement to form a road engaging cleat adapted to embrace the periphery and side walls of a vehicle tire, means for causing said cleat to grip a vehicle tire including a flexible cable tension member having one section slidably connected to a portion of said elements and secured to one end element, a cross rod connected to the ends of said section, a second cable section slidably connected to the remaining elements and secured to the other end element, a second cross rod connected to the ends of said second cable section, a locking lever having parallel cam slots engaging said cross rods adjacent the opposite ends thereof to draw said rods together and thereby reduce the effective length of said tension member to cause said cleat to contract and grip the periphery and side walls of a tire.

4. A traction device comprising a curved flexible cleat, means for contracting and expanding said cleat including a tension member having separate sections connected one to each end of the cleat and extending inwardly thereof, a separate cross rod connected to the inner end of each of said sections and extending transversely of the cleat, a clamping lever having intersecting slots of different length receiving said cross rods whereby operating said lever to selectively position said cross rods in one or the other of said slots causes the effective length of said tension member to vary and contract or expand said cleat into and out of gripping engagement with an associated wheel.

5. A traction device comprising a curved flexible cleat, means for contracting and expanding said cleat including a tension member having separate sections connected one to each end of the cleat and extending inwardly thereof, a separate cross rod connected to the inner end of each of said sections and extending transversely of the cleat, a clamping lever having intersecting slots of different length receiving said cross rods whereby operating said lever to selectively position said cross rods in one or the other of said slots causes the effective length of said tension member to vary and contract or expand said cleat into and out of gripping engagement with an associated wheel, said slots being so formed that positioning said rods in the short slot locates said lever in a position adjacent the cleat and releasably locks said cleat in contracted position.

6. A traction device for wheels comprising a plurality of segmental traction elements having outer and inner edges and oppositely inclined ends connecting these edges so said elements are longer at the outer than inner edges, the ends of the outer edges of adjacent elements abutting and the elements connected together for relative hinging movement about the abutting edges to form an arcuate flexible road engaging cleat adapted to embrace the peripheral area of a vehicle tire, and means for contracting said elements into gripping engagement with said tire.

7. A traction device for wheels comprising a plurality of radially tapered traction elements having outer longitudinal edges abutting at the ends for relative hinging movement to form an arcuate flexible road engaging cleat adapted to embrace the peripheral area of a vehicle tire, flexible means for connecting and swinging said elements relatively to each other to contract the cleat into gripping engagement with the periphery and adjacent side areas of said tire, and releasable locking means for holding said cleat in contracted gripping position.

8. A traction device for wheels comprising a plurality of traction elements having tapered ends forming radial outer and inner edges with the outer edges of greater length and abutting adjacent elements at the ends whereby connecting said elements in series with said outer edges in hinging relationship provides a flexible road engaging cleat adapted to embrace the peripheral area of a vehicle tire, means for swinging said elements relatively to each other about said abutting edges to contract the cleat into gripping engagement with the periphery and adjacent sides of said tire, and releasable locking means for holding said cleat in contracted gripping position.

9. A traction device for vehicle wheels comprising a plurality of elements having outer and inner edges connected by tapered ends so that the outer edges are of greater length than the inner edges, the ends of said outer edges of adjacent elements abutting, means connecting the elements together for relative hinging movement about said abutting ends to form a road engaging cleat adapted to embrace the periphery and side walls of a vehicle tire, means for causing said elements to grip a vehicle tire including a tension member extending through the traction elements radially inwardly of the abutting ends of said elements, and means for varying the effective length of said tension member to contract said elements into gripping engagement with the periphery and side walls of said tire.

10. A traction device for vehicle wheels comprising a plurality of generally U-shaped abutting elements including spaced wings connected by a web portion, the web portions connected together for relative hinging movement and forming a road engaging cleat adapted to embrace the periphery and side walls of a vehicle tire, means for causing said cleat to grip a vehicle tire including a tension member comprising a cable slidably connected with the wings at the opposite sides of said U-shaped traction elements, and means for shortening the effective length of said tension member to contract said elements.

11. A traction device for vehicle wheels comprising a plurality of segmental elements including outer and inner edges, said elements abutting at the ends of their outer edges only and connected together for relative hinging movement about said abutting ends to form a road engaging cleat adapted to embrace the periphery and side walls of a vehicle tire, means for causing said cleat to grip a vehicle tire including a flexible tension member slidably connected with the radial inner edges of said elements, and means for varying the effective length of said tension member to cause said elements to grip the periphery and side walls of a tire.

12. A traction device for pneumatic tires comprising a plurality of generally U-shaped segmental elements having spaced wings and connecting webs between them, the ends of webs of adjacent elements connected together for relative hinging movement to form a road engaging cleat adapted to embrace the periphery and side walls of a pneumatic tire, said U-shaped elements having eyes opening longitudinally of the wings, a cable extending slidably through said eyes, and means for varying the effective length of the cable to contract said elements into gripping engagement with a tire.

KOESTER E. SCHONERT.

REFERENCES CITED

The following references are of record in the file of this patent:

UNITED STATES PATENTS

| Number | Name | Date |
|---|---|---|
| 1,297,155 | Harrington | Mar. 11, 1919 |
| 2,464,564 | Dunner | Mar. 15, 1949 |